（12）United States Patent
Matsumoto et al.

(10) Patent No.: US 7,886,250 B2
(45) Date of Patent: Feb. 8, 2011

(54) RECONFIGURABLE INTEGRATED CIRCUIT

(75) Inventors: Yohei Matsumoto, Tsukuba (JP);
Hanpei Koike, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 382 days.

(21) Appl. No.: 12/103,229

(22) Filed: Apr. 15, 2008

(65) Prior Publication Data

US 2008/0282214 A1    Nov. 13, 2008

(30) Foreign Application Priority Data

Apr. 27, 2007    (JP) ............... 2007-119653

(51) Int. Cl.
*G06F 17/50*    (2006.01)
(52) U.S. Cl. ............... 716/16; 716/1; 716/2; 716/17
(58) Field of Classification Search ............... 716/1, 716/2, 16, 17
See application file for complete search history.

(56) References Cited

U.S. PATENT DOCUMENTS

| 6,914,449 | B2 | 7/2005 | Kaviani | |
| 7,477,073 | B1* | 1/2009 | Tuan et al. | 326/41 |
| 7,626,423 | B1* | 12/2009 | Li et al. | 326/86 |

OTHER PUBLICATIONS

Suresh Srinivasan, et al., "Leakage Control in FPGA Routing Fabric", IEEE Proc. ASP-DAC '05, 2005, pp. 661-664.
Jason H. Anderson, et al., "Low-Power Programmable Routing Circuitry for FPGAs", IEEE Proc. ICCAD '04, pp. 602-609.
Arifur Rahman, et al., "Determination of Power Gating Granularity for FPGA Fabric", IEEE 2006 Custom Intergrated Circuits Conference (CICC), 2006, pp. 9-12.
Yan Lin, et al., "Power Modeling and Architecture Evaluation for FPGA with Novel Circuits for Vdd Programmability", Proc. FPGA '05, Feb. 20-22, 2005, pp. 199-207.
Eiji Morifuji, et al., "Supply and Threshold-Voltage Trends for Scaled Logic and SRAM MOSFETs", IEEE Transactions on Electron Devices, vol. 53, No. 6, Jun. 2006, pp. 1427-1432.
Asen Asenov, et al., "Simulation of Intrinsic Parameter Fluctuations in Decananometer and Nanometer-Scale MOSFETs", IEEE Transactions on Electron Devices, vol. 50, No. 9, Sep. 2003, pp. 1837-1852.
Tim Tuan, et al., "A 90nm Low-Power FPGA for Battery-Powered Applications", Proc. FPGA '06, pp. 3-11.

* cited by examiner

*Primary Examiner*—Sun J Lin
(74) *Attorney, Agent, or Firm*—Oblon, Spivak, McClelland, Maier & Neustadt, L.L.P.

(57) ABSTRACT

The purpose of the present invention is to realize reduction of power consumption of reconfigurable integrated circuits such as FPGAs by decreasing leakage current in SRAMs.

A reconfigurable integrated circuit is provided which includes transistors and comprises a first switch with an input terminal, an output terminal, and a control terminal, a first memory with a memory cell connected to the control terminal of the first switch, a second switch capable of shutting down a power supply line or a ground line of the first memory, and a second memory to control the second switch, wherein a value to open the second switch is written into the second memory when the first switch is not operated, thereby shutting down the power supply line or the ground line of the first memory.

16 Claims, 16 Drawing Sheets

RECONFIGURABLE INTEGRATED CIRCUIT

BACKGROUND OF THE INVENTION

The present invention relates to a reconfigurable integrated circuit such as an FPGA (Field-programmable gate array).

FPGAs are increasing their importance rapidly with growing needs to reduce the NRE cost and the design turnaround time resulting from the miniaturization of the semiconductor integrated circuit technology.

FIG. 1 shows a general view of a typical FPGA. 101 is a GSM (Global switch matrix), 102 is an LSM (local switch matrix), and 103 is an LE (Logic Element), and an FPGA is configured basically by arranging identical tiles 104 including these elements. In each of the tiles, there are a plurality of LEs, which can be mutually connected by the LSM. Furthermore, each of the LEs can be connected to the LEs in each tile through the LSM and the GSM. The GSMs are connected to each other by interconnections 105 and 106 arranged in a grid pattern.

As shown in FIG. 2, the LE is typically comprising a programmable logic element (201) such as an LUT (Look Up Table), a memory element (202) such as a DFF (D-Flip Flop), and a multiplexer (203) to control signal paths between them.

FIG. 3 shows a basic circuitry of the GSM and the LSM. The inside of the GSM and the LSM is comprised of a plurality of interconnection switches (multiplexer) for making each input of a switch matrix correspond to each output thereof.

FIG. 4 shows a typical circuitry of an LUT, and the inside thereof is comprised of pass transistors connected in a tree shape and an SRAM (302) connected to the leaf node thereof. Inputs (301) of an LUT is connected to the gate of the pass transistor tree, and each SRAM value corresponding to any combinations of input signals is selected and output to an output 303. Furthermore, 304 is a pull up PMOS to recover a decrease of the signal level due to NMOS pass transistors.

Although FPGAs are one of the integrated circuits capable of receiving the greatest benefits from the miniaturization of the semiconductor integrated circuit technology because of their regular fabric, the increasing leakage current resulting from the miniaturization of the integrated circuit technology has become a problem.

Once reconfigurable integrated circuits such as FPGAs are given functions, a large number of circuit resources thereon are unused, which increases the leakage current. For example, interconnection switches make up a large percentage (80 to 90%) of transistors in FPGAs, however, more than 90% of the interconnection switches are unused during the operation of FPGAs [Non-Patent Document 1]. The leakage current in the unused interconnection switches is extremely large. In order to solve this problem, methods for reducing leakage current in FPGAs by shutting down a power source of an output buffer of unused interconnection switches have been proposed in recent years [Patent Document 1, Non-Patent Document 2, 3, 4].

On the other hand, leakage current in SRAMs for controlling interconnection switches of FPGAs is also large, which makes up 40% of the total leakage current when no countermeasure is taken [Non-Patent Document 7]. The Non-Patent Document 7 discloses that leakage current in SRAM cells can be reduced dramatically by increasing the thickness of gate oxide films of transistors of SRAM cells. This method is applicable because SRAMs of FPGAs do not require high-speed reading and writing.

However, dropping supply voltages or increasing threshold voltages of SRAMs is difficult due to the reduction in the operation margin of SRAM cells resulting from process variation [Refer to Non-Patent Document 5]. Therefore, leakage current in SRAMs will be larger than that in other circuit resources. Furthermore, since the method for increasing the thickness of a gate oxide film increases not only leakage current due to DIBL but also process variation [Non-Patent Document 6], it is not practical to use this method. Thus reducing leakage current in SRAMs is very important in reduction of power consumption in FPGAs.

[Patent Document 1] U.S. Pat. No. 6,914,449

[Non-Patent Document 1] S. Srinivasan et al., "Leakage Control in FPGA Routing Fabric", Proc. ASP-DAC '05, pp. 661-664.

[Non-Patent Document 2] J. Anderson et al., "Low-power programmable routing circuitry for FPGAs", Proc. ICCAD '04, pp. 602-609.

[Non-Patent Document 3] A. Rahman et al., "Determination of Power Gating Granularity for FPGA Fabric", Proc. CICC '06, pp. 9-12.

[Non-Patent Document 4] Y. Lin et al., "Power Modeling and Architecture Evaluation for FPGA with Novel Circuits for Vdd Programmability," Proc. FPGA '05, pp. 199-207.

[Non-Patent Document 5] E. Morifuji, "Supply and Threshold-Voltage Trends for Scaled Logic and SRAM MOSFETs", IEEE Trans. Electron Devices, Vol. 53, No. 6, pp. 1427-1432, 2005.

[Non-Patent Document 6] A. Asenov, "Simulation of Intrinsic Parameter Fluctuations in Decananometer and Nanometer-Scale MOSFETs", IEEE Trans. Electron Devices, Vol. 50, No. 9, pp. 1837-1852, 2003.

[Non-Patent Document 7] T. Tuan, "A 90 nm Low-Power FPGA for Battery-Powered Applications," Proc. FPGA '06, pp. 3-11.

In the reconfigurable integrated circuits such as FPGAs, leakage current in SRAMs increases relatively with progress in miniaturization of the semiconductor integrated circuit technologies. The purpose of the present invention is to realize reduction of power consumption in reconfigurable integrated circuits such as FPGAs by reducing leakage current in SRAMs.

SUMMARY OF THE INVENTION

To solve the problems as described above, the present invention provides the following means.

(1) A reconfigurable integrated circuit including transistors, comprising a first switch with an input terminal, an output terminal, and a control terminal, a first memory with a memory cell connected to the control terminal of the first switch, a second switch capable of shutting down a power supply line or a ground line of the first memory, and a second memory for controlling the second switch, wherein a value to open the second switch is written into the second memory when the first switch is not operated, thereby shutting down the power supply line or the ground line of the first memory.

(2) The reconfigurable integrated circuit described in (1), wherein the control terminal of the first switch is connected to the first memory through a first CMOS logic gate, and the first CMOS logic gate shares a common power supply line or a ground line with the first memory.

(3) The reconfigurable integrated circuit described in (1) or (2), further comprising a third switch capable of shorting the control terminal of the first switch to the ground line or the power supply line.

(4) The reconfigurable integrated circuit described in (3), wherein the third switch is controlled by the second memory.

(5) The reconfigurable integrated circuit described in (3), wherein the third switch shorts only the control terminal of a group of transistors in the nearest neighbor of the input terminal of the first switch to the ground line or the power supply line.

(6) The reconfigurable integrated circuit described in any one of (1) to (5), wherein the output terminal of the first switch is connected to a fourth switch which is controlled by the second memory cell and connected to the ground line or the power supply line.

(7) The reconfigurable integrated circuit described in any one of (1) to (6), wherein the input terminal and the output terminal of the first switch is connected to a second CMOS logic gate capable of shutting down the power supply line or the ground line by using a fifth switch, and wherein the fifth switch is controlled by the second memory.

(8) The reconfigurable integrated circuit described in any one of (1) to (7), wherein at least two inputs and one output of the first switch are connected by an encode type multiplexer.

(9) The reconfigurable integrated circuit described in any one of (1) to (7), wherein at least two inputs and one output of the first switch are connected by a decode type multiplexer.

(10) The reconfigurable integrated circuit described in any one of (1) to (9), wherein at least one of the first memory and the second memory is an SRAM.

(11) The reconfigurable integrated circuit described in any one of (1) to (10), wherein the second switch comprises a PMOS and shuts down the power supply line.

(12) The reconfigurable integrated circuit described in any one of (1) to (10), wherein the second switch comprises an NMOS and shuts down the ground line.

(13) The reconfigurable integrated circuit described in any one of (1) to (12), wherein the output of the first switch includes a buffer and a sixth switch to pull down the input thereof, and the sixth switch is controlled by the second SRAM.

(14) The reconfigurable integrated circuit described in any one of (1) to (12), wherein the output of the first switch includes a buffer and a seventh switch capable of shutting down the power supply line or the ground line thereof, and the seventh switch is controlled by the second SRAM.

(15) The reconfigurable integrated circuit described in (14), wherein the seventh switch is identical with the second switch.

(16) The reconfigurable integrated circuit described in any one of (1) to (12), wherein the output of the first switch includes a buffer and a bias control circuit capable of controlling or selecting a substrate bias thereof, and the bias control circuit is controlled by the second SRAM.

DESCRIPTION OF THE PREFERRED EMBODIMENTS

FIG. 5 to 8 shows various examples of the multiplexer circuitry.

Figure 1:
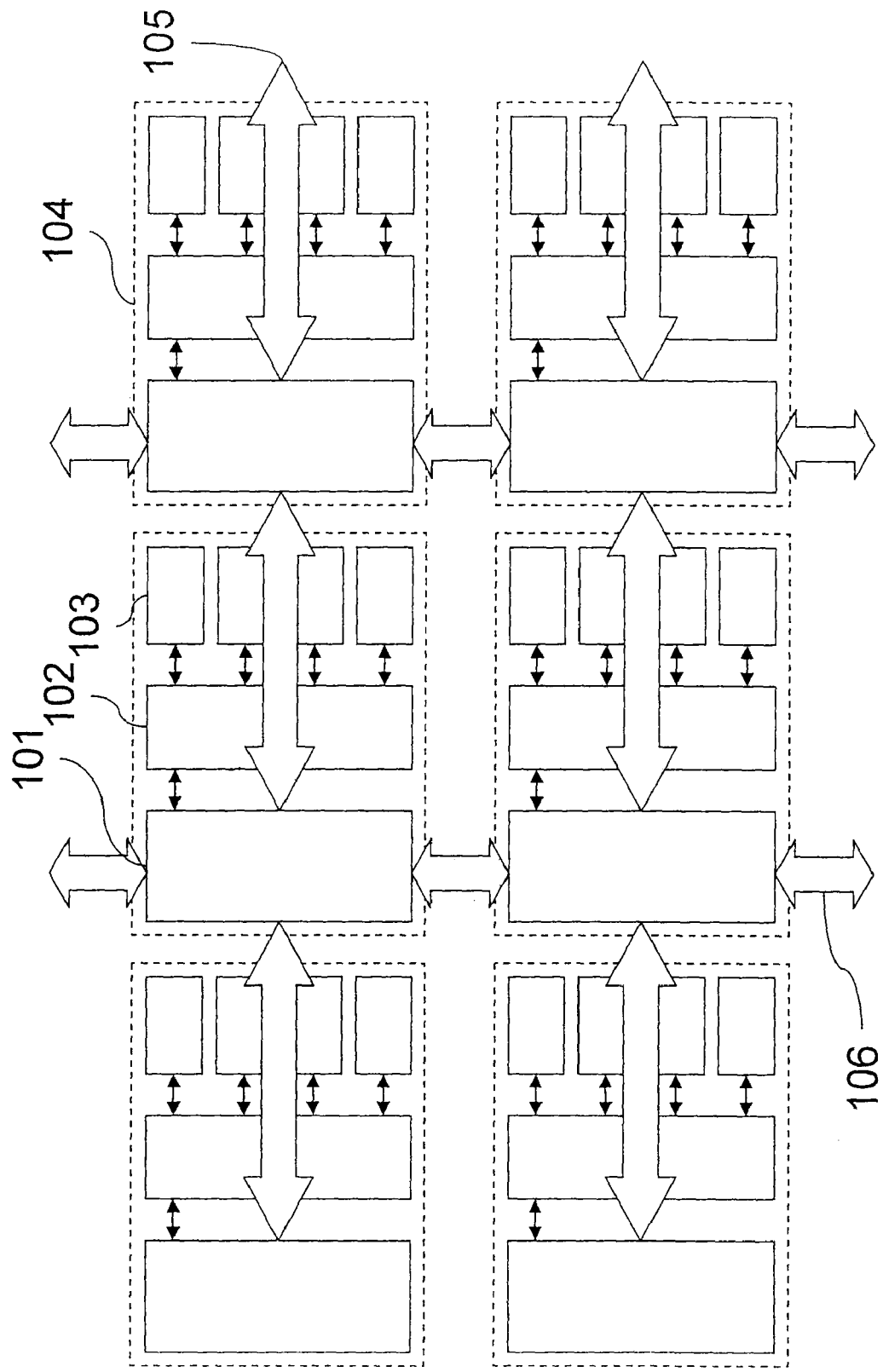
FIG. 1 shows a general view of an FPGA.
Figure 2:
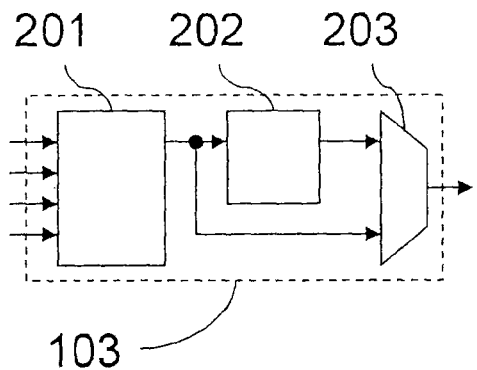
FIG. 2 shows a basic circuitry of an LE.
Figure 3:
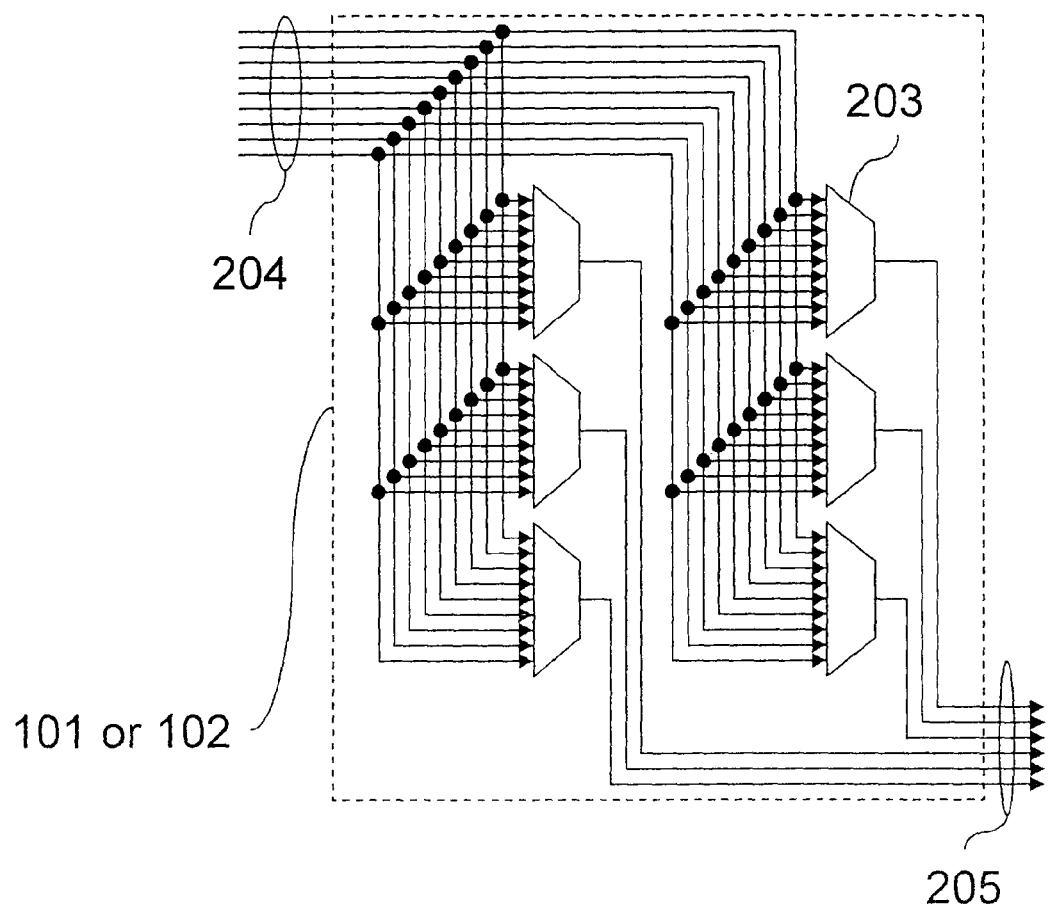
FIG. 3 shows a basic circuitry of a GSM and an LSM.
Figure 4:
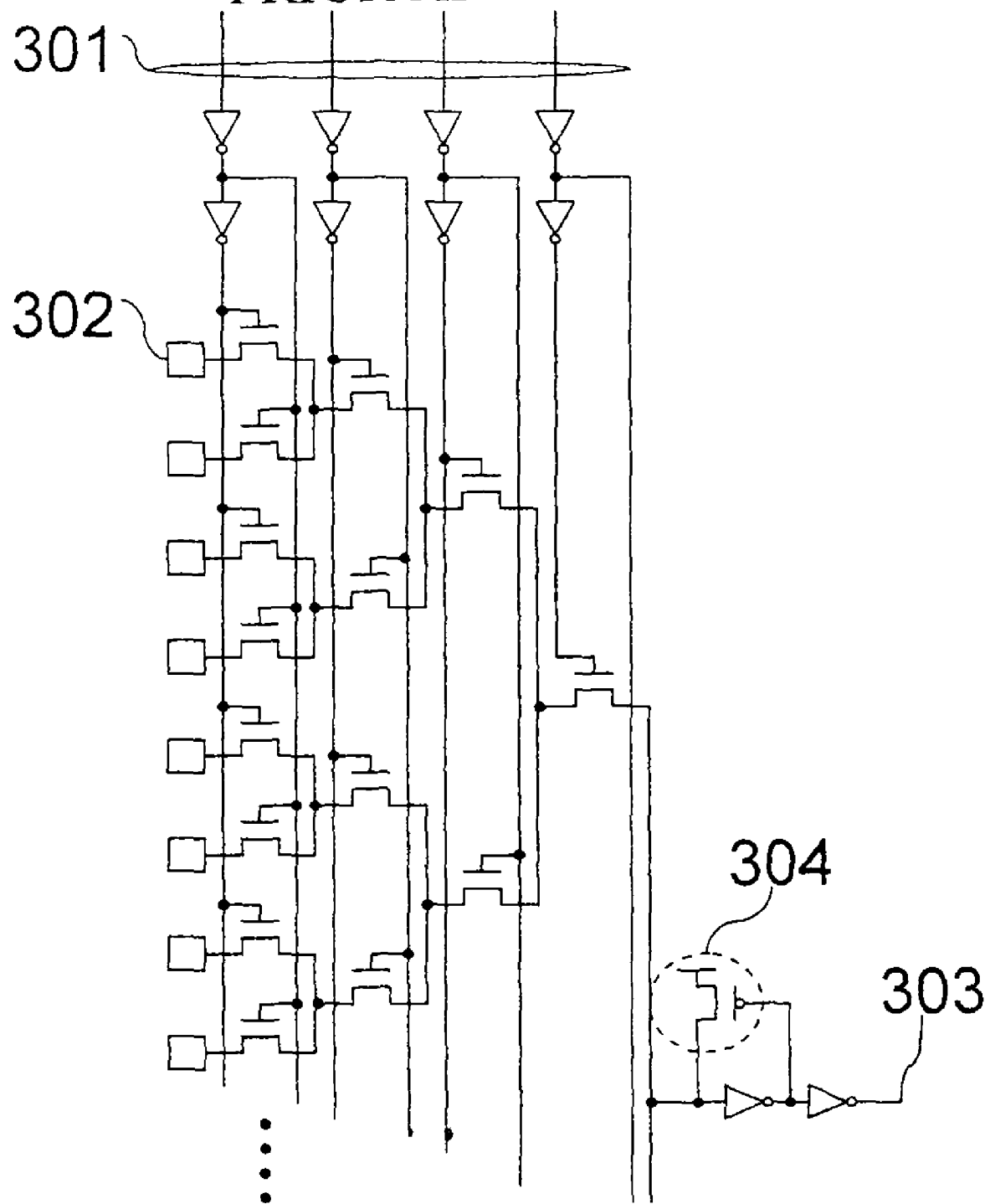
FIG. 4 shows a circuitry of a typical LUT.
Figure 5:
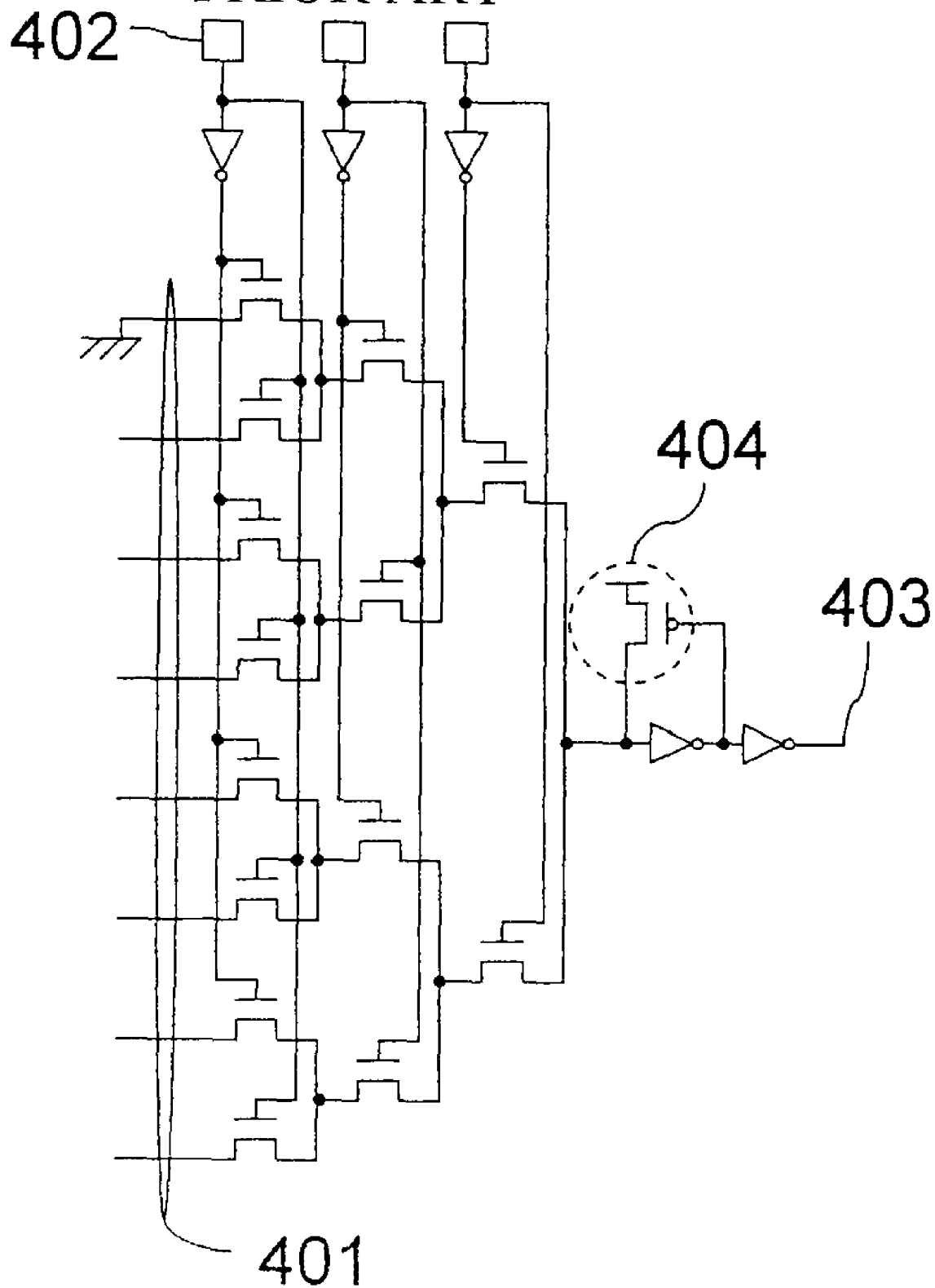
FIG. 5 shows an example of a basic multiplexer.

FIG. 5 is an encode type multiplexer with 8 inputs. SRAMs (402) drive the gate of the pass transistors connected in a tree shape. One of the 8 inputs (401) is selected and output to a terminal 403 depending on value of the SRAMs. The output requires a PMOS pull up in the same way as in an LUT (FIG. 4). In order to reduce leakage current during nonuse, it is effective to drop the input signal to an output buffer down to 0. In the example shown in this figure, since one of the inputs is grounded, this dropping down is realized by inputting a value to select the corresponding input, which is all 0 in this case, to the SRAMs.

Figure 6:
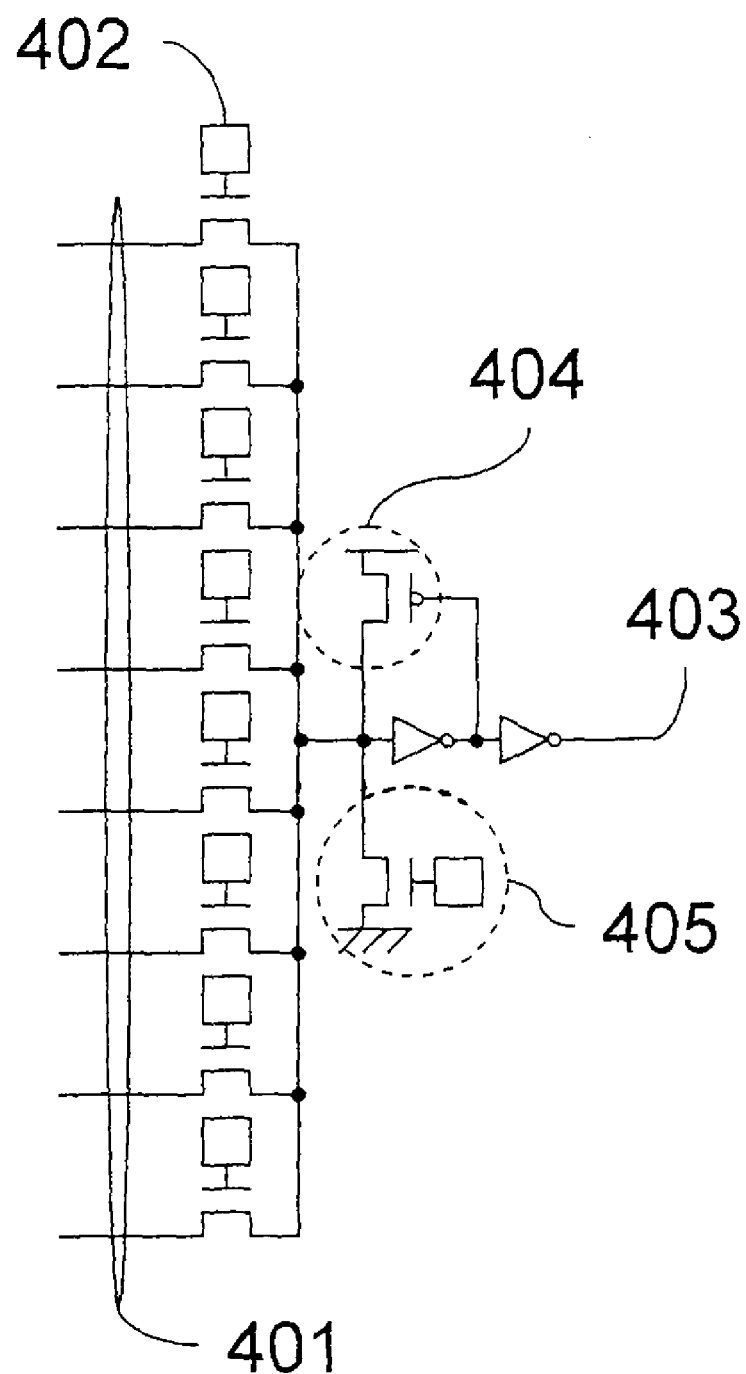
FIG. 6 shows an example of a basic multiplexer.

FIG. 6 is a decode type multiplexer with 8 inputs. Individual SRAM cell is provided to control each of pass transistors. In order to drop the output signal down to 0 during nonuse, an NMOS (405) to pull down the output and an SRAM are provided. Compared with this decode type multiplexer, an encode type multiplexer has an advantage that the number of SRAM cells required is smaller, but at the same time has disadvantages that the number of the stage of transistors for signal to pass through is larger, and that gate leakage current larger because of pass transistors being ON during nonuse.

Figure 7:
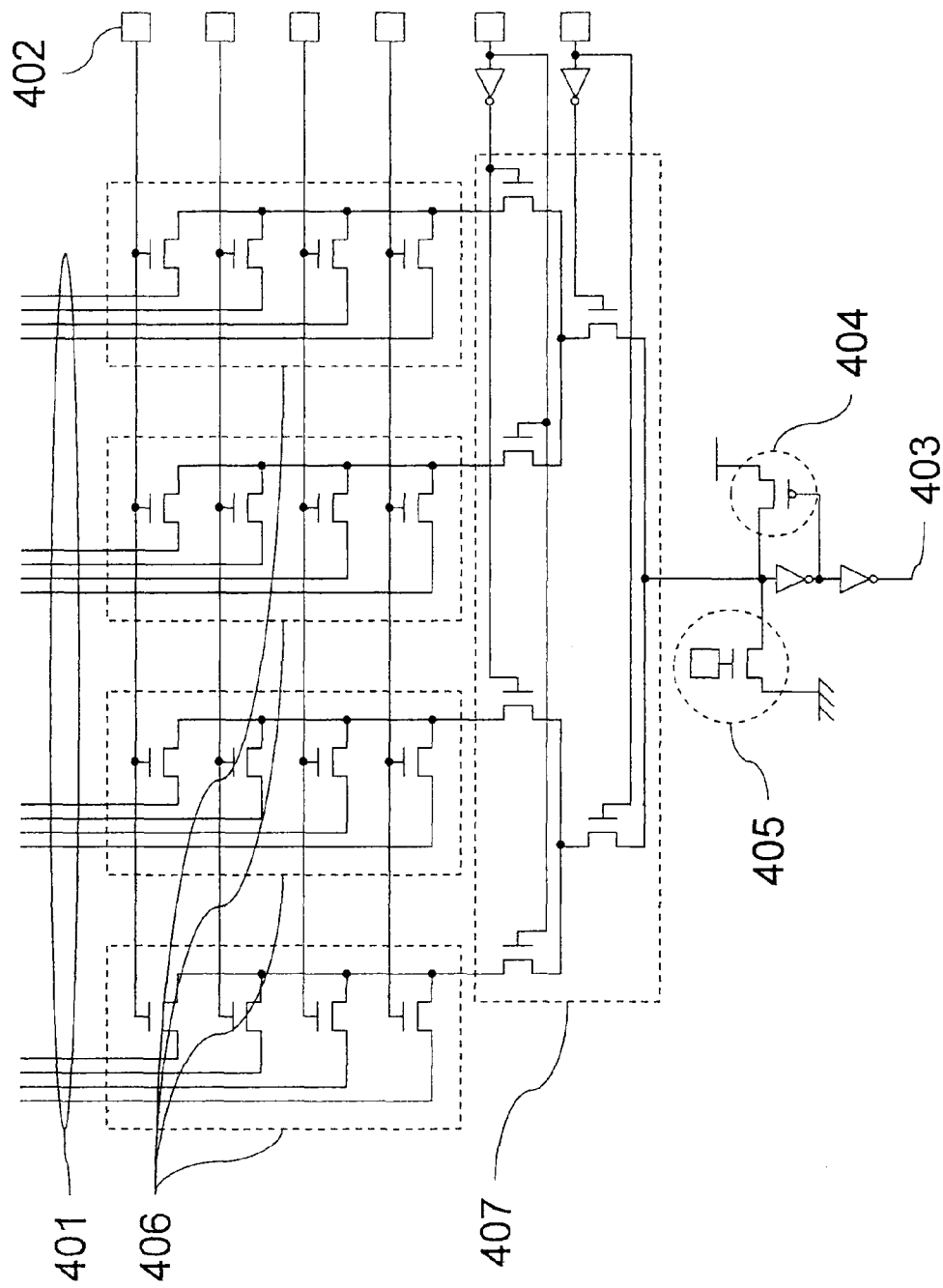
FIG. 7 shows an example of a basic multiplexer.

A multiplexer made up of a combination of a decode type and an encode type as shown in FIG. 7 is used in practice. FIG. 7 is a hybrid type multiplexer with 16 inputs which has 4 decode type multiplexer with 4 inputs (406) in the front part and an encode type multiplexer with 4 inputs (407) in the latter part. The 4 decode type multiplexers can share the control SRAM. During nonuse, a perfectly high impedance state can be realized by making all of the decode type multiplexers in the front part set to OFF, thereby enabling to prevent leakage current from the encode type multiplexers in the latter part to the input side.

Figure 8:
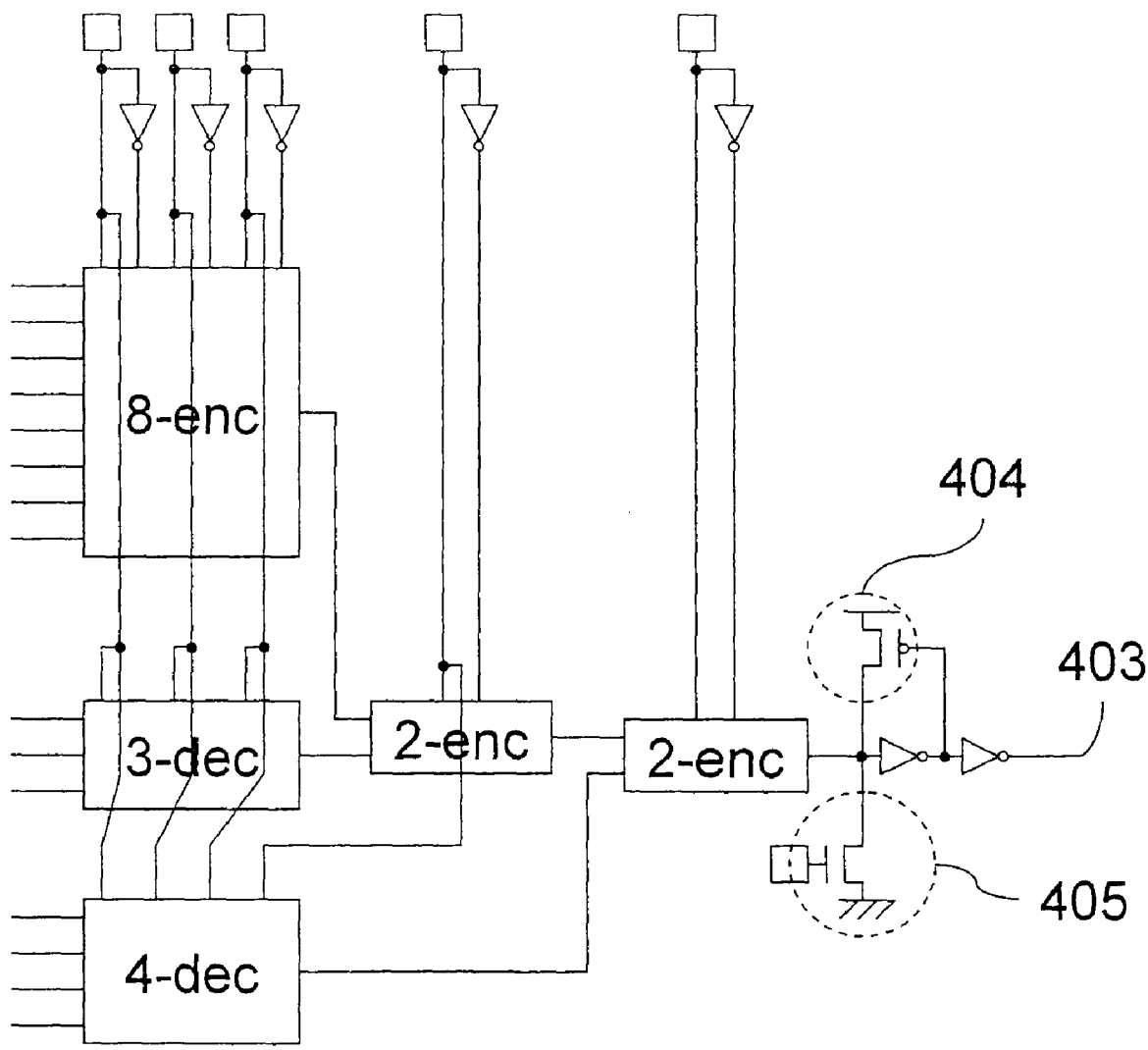
FIG. 8 shows an example of another multiplexer.

Similarly to decode type multiplexers, a pull down NMOS (405) is required. Furthermore, various other circuitries of multiplexers made up of a combination of a decode type multiplexer and an encode type multiplexer are possible. FIG. 8 shows a multiplexer with 15 inputs realized by combining 4 types of multiplexers, an encode type multiplexer with 8 inputs, an encode type multiplexer with 2 inputs, a decode type multiplexer with 3 inputs, and a decode type multiplexer with 4 inputs. In this figure, 8-enc and 2-enc represent encode type multiplexers with 8 inputs and 2 inputs, respectively, and 3-dec and 4-dec shows decode type multiplexers with 3 inputs and 4 inputs, respectively.

Figure 9:
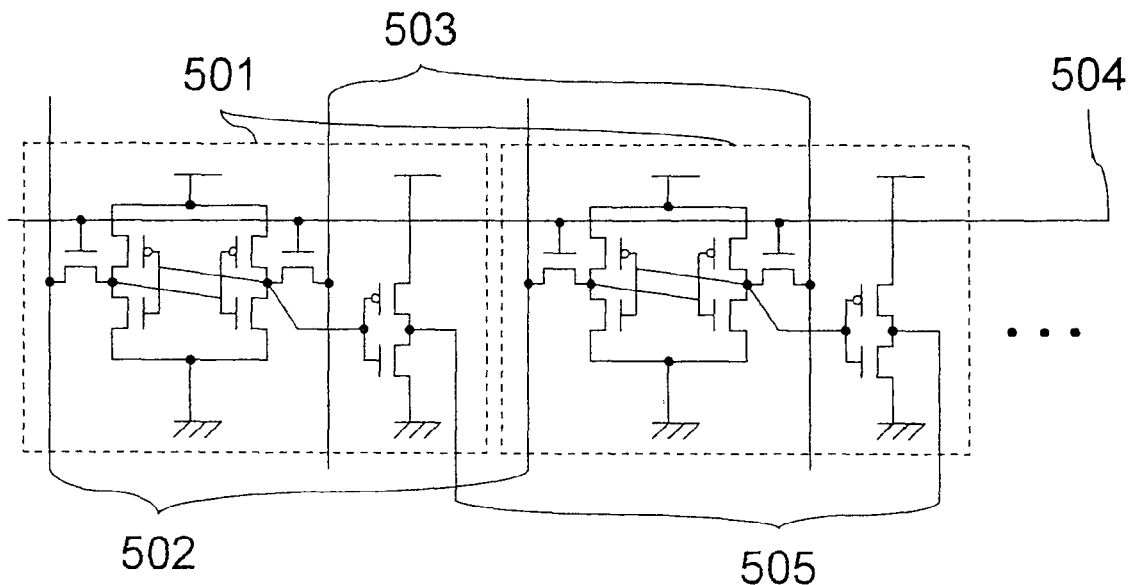
FIG. 9 shows a typical SRAM cell.

FIG. 9 illustrates a typical example of an SRAM cell used in FPGAs. 502 and 503 are a bit line and an inversion thereof, and 504 is a word line. In the circuitry shown in FIG. 9, the output 505 of the SRAM is separated from additional capacitance of the control node by an inverter.

Figure 10:
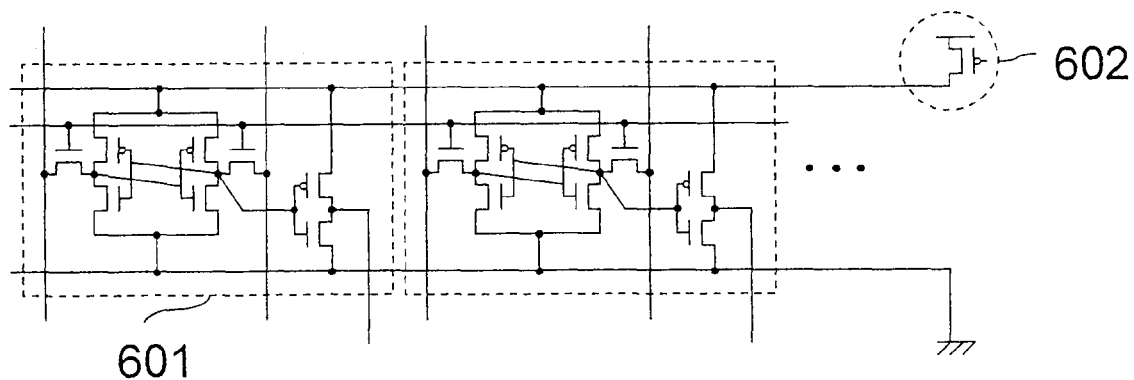
FIG. 10 shows a SRAM with a function to shut down power source.
Figure 11:
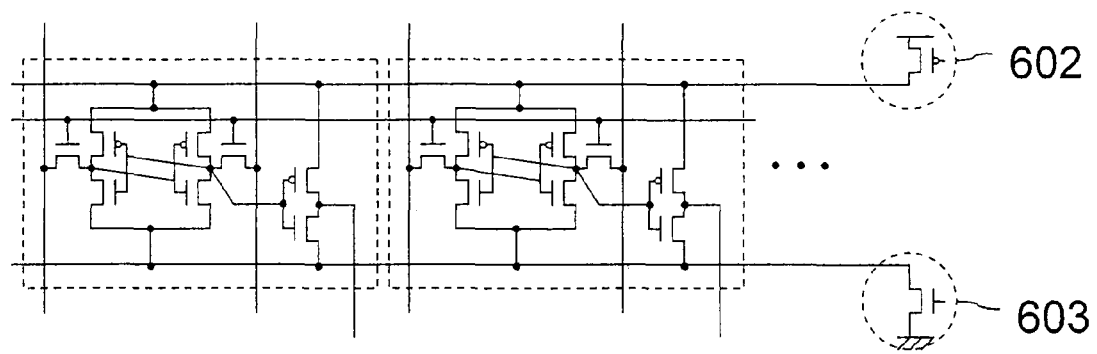
FIG. 11 shows a SRAM with a function to shut down power source.
Figure 12:
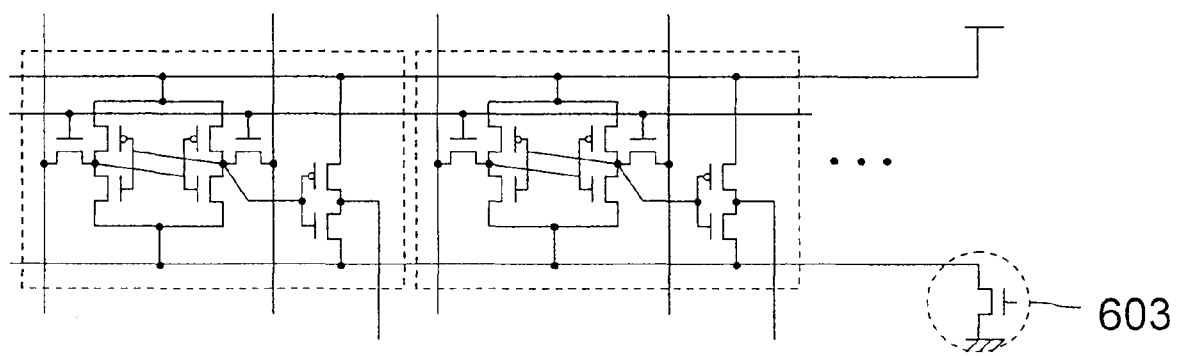
FIG. 12 shows a SRAM with a function to shut down power source.

Moreover, SRAMs shown in FIG. 10 to 12 are the SRAM shown in FIG. 9 furthermore comprising a function to shut down the power supply. Circuitries shown in FIGS. 10, 11 and 12 are capable of shutting down the power supply line, the ground line, and both of them, respectively, by PMOS and NMOS transistors. Not only the SRAM shown in FIG. 9 but also any other SRAM cells are capable of shutting down the power supply similarly by inserting PMOS and NMOS transistors into the power supply line and/or the ground line, therefore, application of the present invention is not limited to this example.

Figure 13:
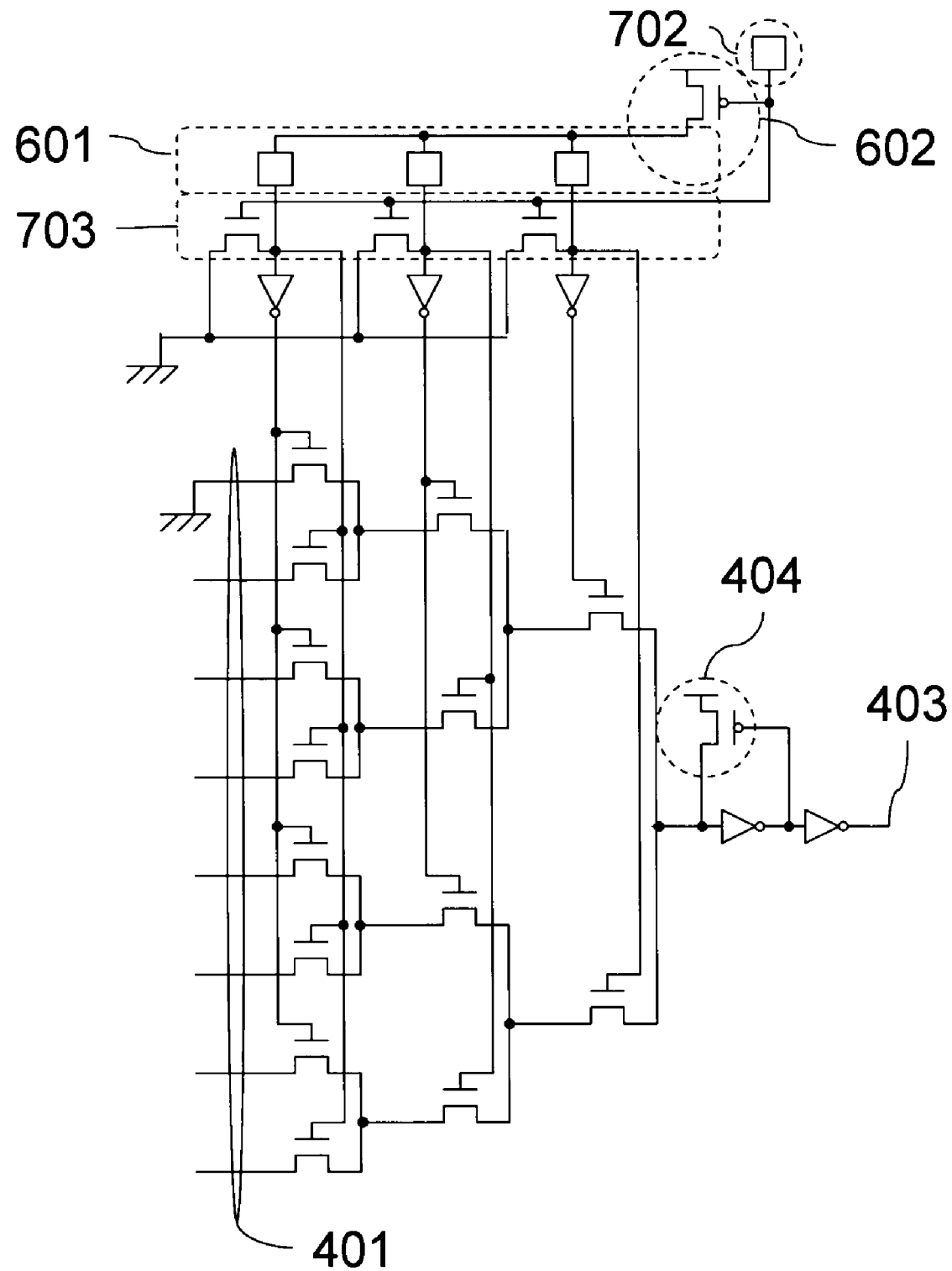
FIG. 13 shows an encode type multiplexer with 8 inputs with a function to shut down power source of SRAM cell.
Figure 14:
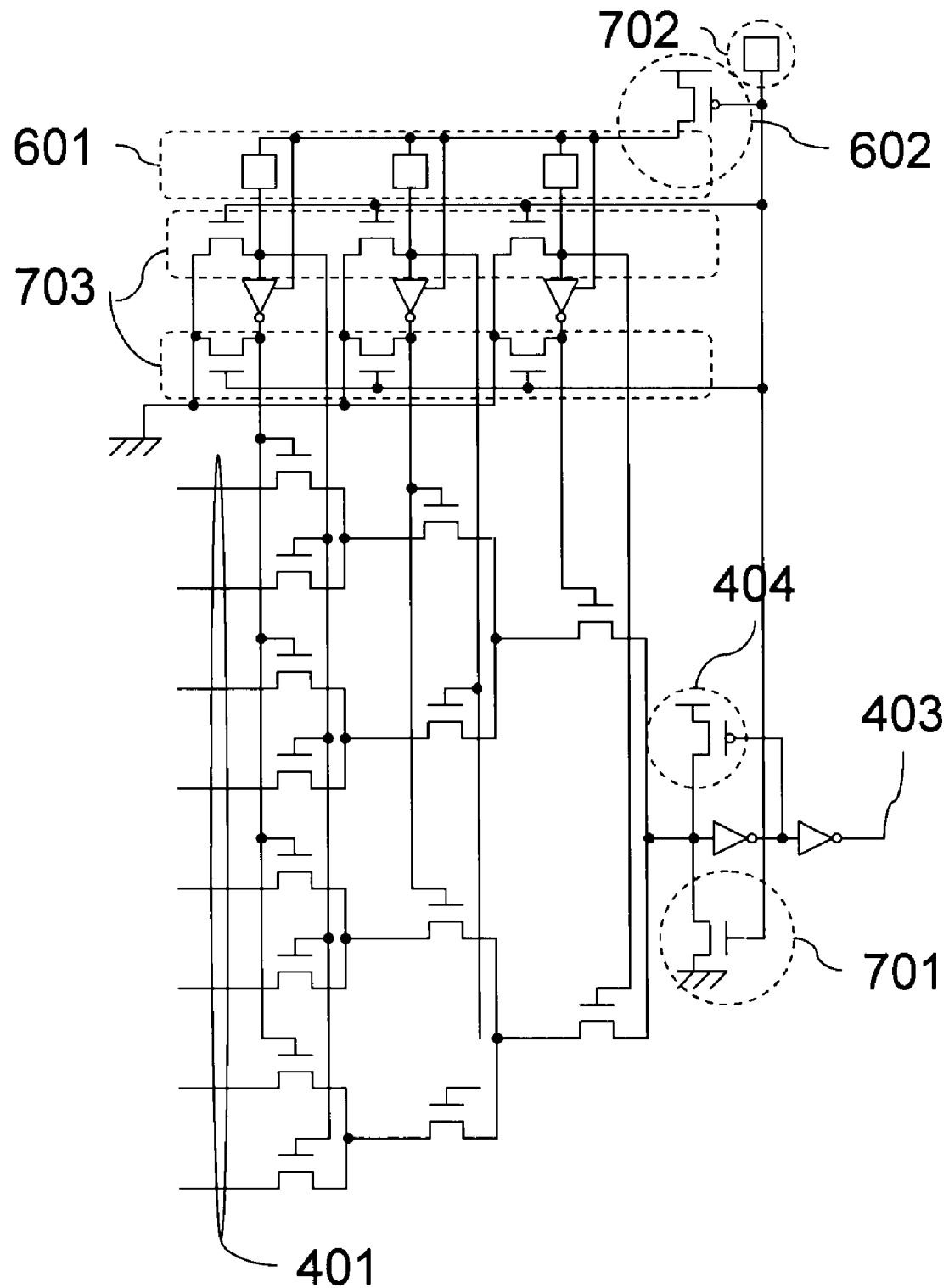
FIG. 14 shows an encode type multiplexer with 8 inputs with a function to shut down power source of SRAM cell.
Figure 15:
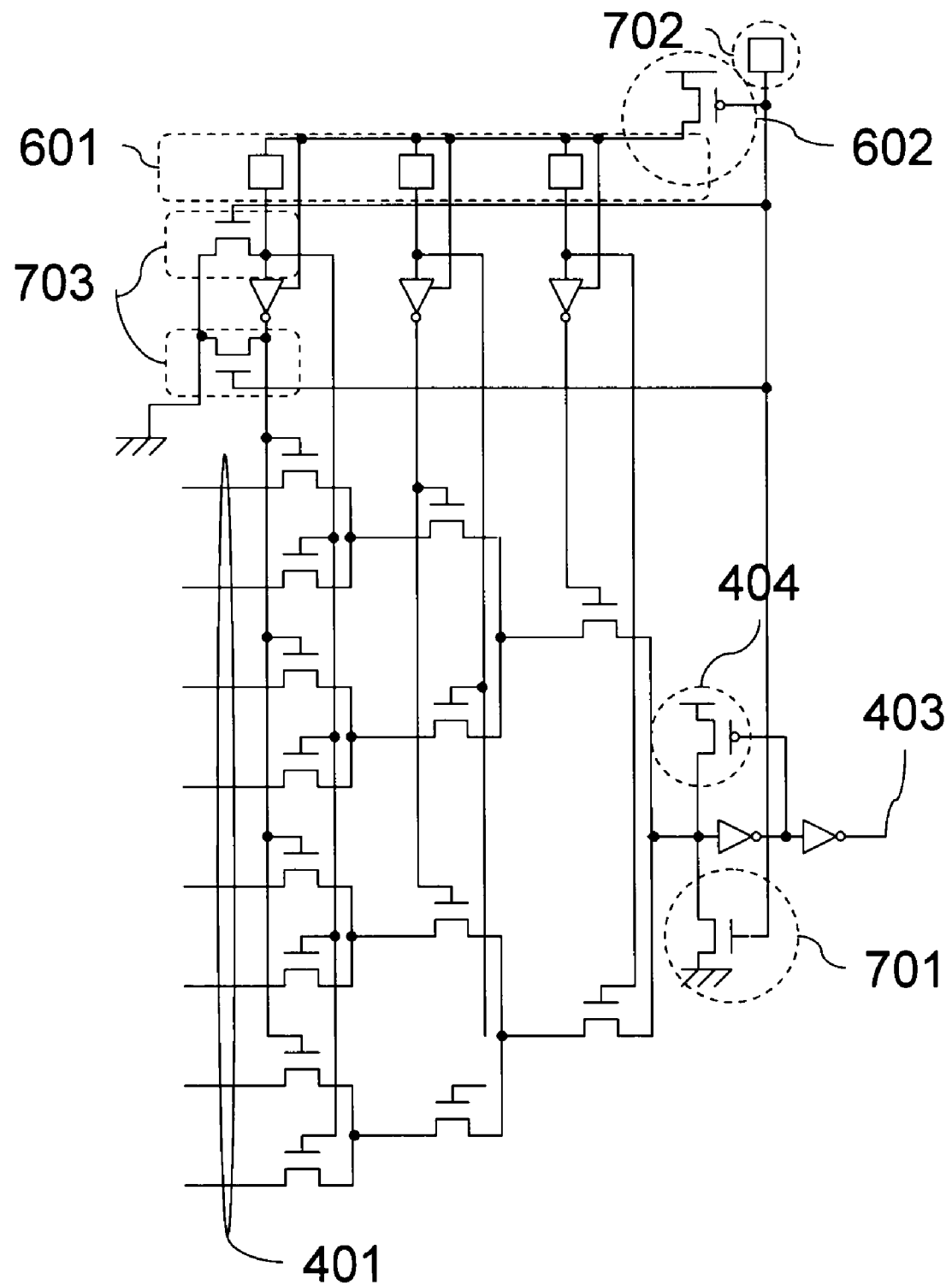
FIG. 15 shows an encode type multiplexer with 8 inputs with a function to shut down power source of SRAM cell.

FIG. 13 to 15 is an embodiment of applying the present invention to the encode type multiplexer with 8 inputs shown in FIG. 5.

In FIG. 13, the SRAM shown in FIG. 10 is applied to the encode type multiplexer shown in FIG. 5, where the PMOS (602) inserted into the power supply line is controlled by the SRAM cell 702. In the following embodiments, the circuitries of SRAM cells 702, 802, 902 and 1002 are assumed as 501 in FIG. 9. Moreover, basically, pull down NMOSs 701, 801, 901 and 1001 play the same role as 405 with the corresponding SRAM cells 702, 802, 902 and 1002. During nonuse, a value 1 is stored in the cell 702 to shut down the power supply of the SRAM. Then, the output of the SRAM is forced to be grounded by the pull down NMOS 703, the gate thereof is controlled by the SRAM cell 702, so that the input which is connected to the ground line is selected.

This change requires the addition of one SRAM, three pull down NMOS, and one PMOS to shut down the power source to FIG. 5, which corresponds to the addition of 12 transistors if one SRAM is assumed to include 8 transistors, and corresponds to an increase in numbers of transistors by about 28% since the multiplexer shown in FIG. 5 is composed of 44 transistors. The leakage current during nonuse decreases to about ⅓ since the numbers of operating SRAMs becomes one during nonuse.

FIG. 14 shows another embodiment where the power supply of inverters for generating inverted signals of the SRAMs driving the pass gate can also be shut down in the multiplexer shown in FIG. 13, so that the leakage current of the inverter for generating the inverted signal of the SRAM 601 can also be reduced. During nonuse, the output of the inverter becomes in a floating state, and therefore is pulled down compulsorily by NMOSs 703 in the same way as the output of the SRAM 601.

Thus, since all of the pass gates can be set in a OFF state during nonuse, leakage current in parts other than SRAMs can be reduced. In addition, since all of the input of the multiplexer becomes in high impedance state, a pull down NMOS at the output and the SRAM (702) are required in the case of decode type multiplexers. Because this SRAM cell can also be used as the SRAM for shutting down the power supply line, there is no increase in number of SRAM cells as compared with the circuitry shown in FIG. 13. Although 4 NMOSs are increased as compared to FIG. 13, the number of inputs increases by one because all of the inputs can be in a high impedance state and a grounded input is not required.

Since the number of the pass transistors increases by 2 when the number of the inputs increases by one, an effective increase in number of transistors corresponds to 2 NMOSs as compared with FIG. 13.

FIG. 15 shows another embodiment of the present invention where a compulsory pull down of the control input to the gate of the pass gate is limited only to the front part pass gate on the input side of the multiplexer shown in FIG. 14. Although gates of the pass gate other than those on the input side become in a floating state, which causes no problem because the leak pass on the input side is perfectly shut down. This embodiment can reduce 4 NMOSs as compared to FIG. 14, and numbers of transistors added to FIG. 5 is 10 MOSs (about 27%). By adding small numbers of transistors, leakage current can be reduced effectively.

Figure 16:
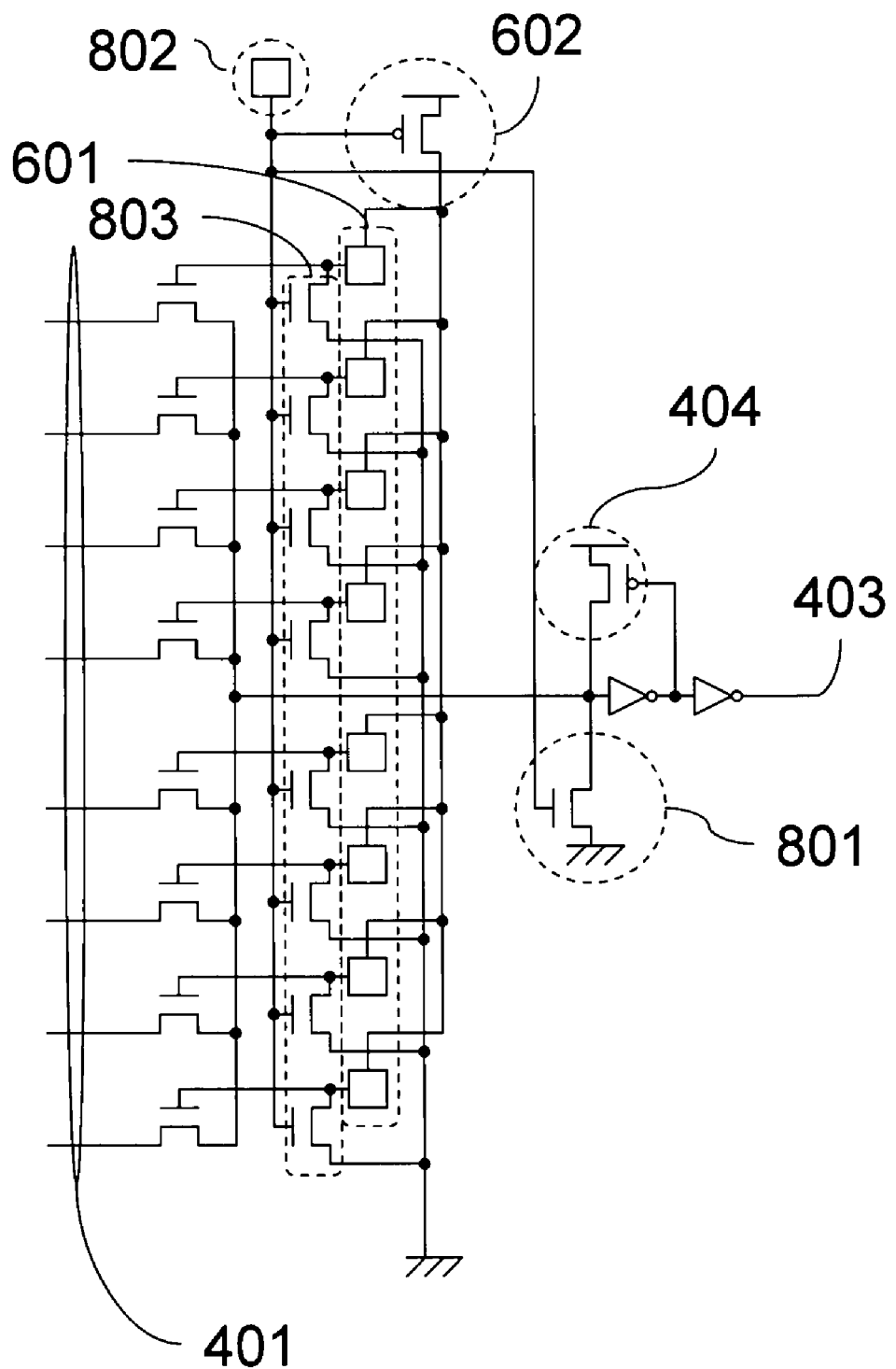
FIG. 16 shows a decode type multiplexer with 8 inputs with a function to shut down power source of SRAM cell.

FIG. 16 shows an embodiment of applying the present invention to FIG. 6. The SRAM shown in FIG. 10 is applied to the decode type multiplexer shown in FIG. 6, and the PMOS transistor (602) inserted in the power supply line is controlled by the SRAM cell 802. Similar to the case of FIG. 13, a value 1 is stored in the SRAM cell 802, the power source of the SRAM for controlling the pass gate 601 is shut down, and all of the outputs of the SRAMs are grounded compulsorily by 802 and the pull down NMOSs 803 during nonuse. Since the SRAM cell for controlling the pull down NMOS 801 for pulling down the output during nonuse can be identical with the SRAM 802 for controlling PMOS 602 to shut down the power source, there is no increase in number of SRAM cells due to this addition. The increase in number of transistors due to this change is totally 9 transistors including 8 pull down NMOSs and 1 PMOS for shutting down the power source. Since the multiplexer shown in FIG. 6 is composed of 86 transistors including SRAMs, this change can be realized by increase in number of transistors by about 10%. Furthermore, only one SRAM cell operates during nonuse, leakage current of SRAMs can be suppressed to about ⅕.

Figure 17:
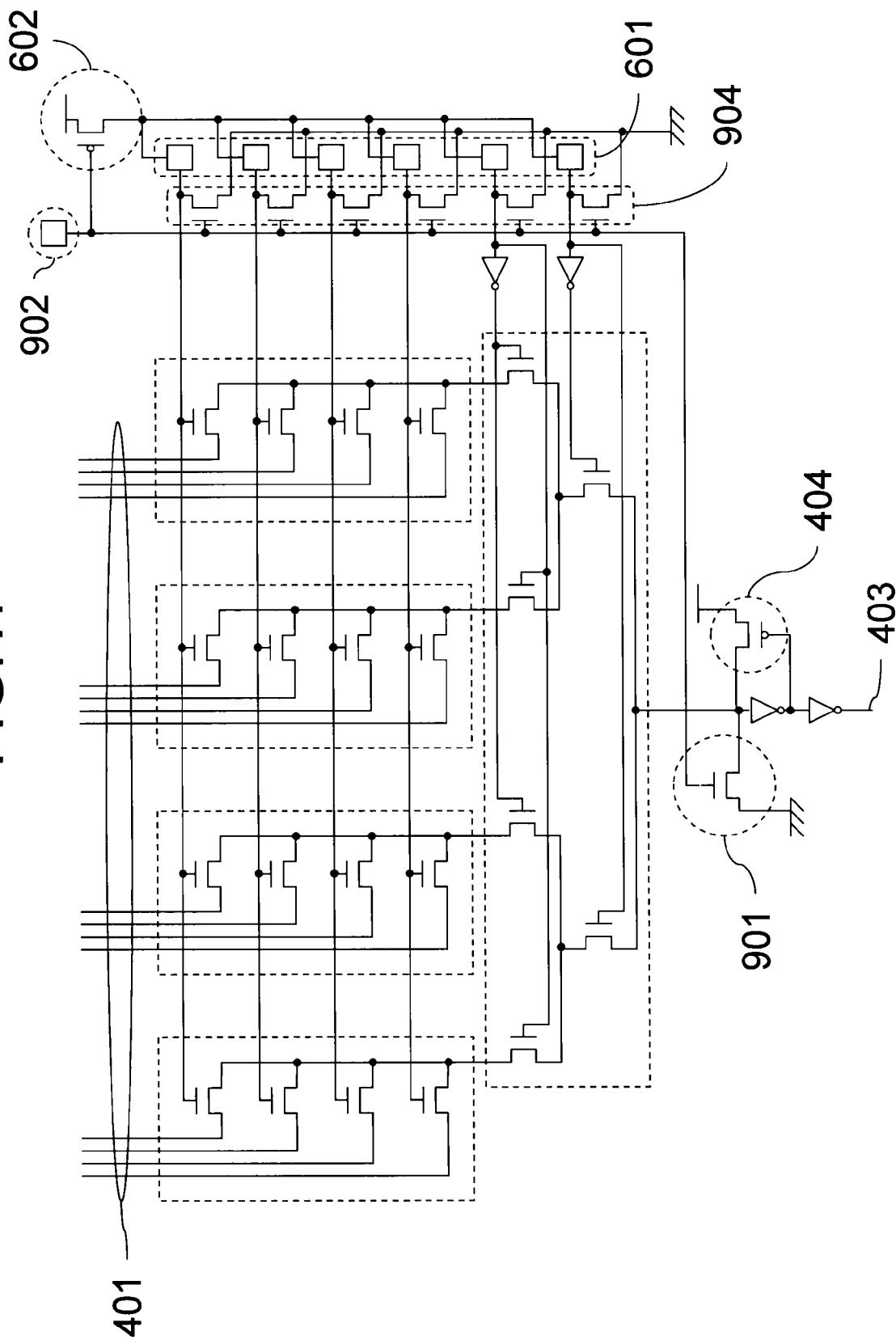
FIG. 17 shows a hybrid type multiplexer with 16 inputs with a function to shut down power source of SRAM cell.
Figure 18:
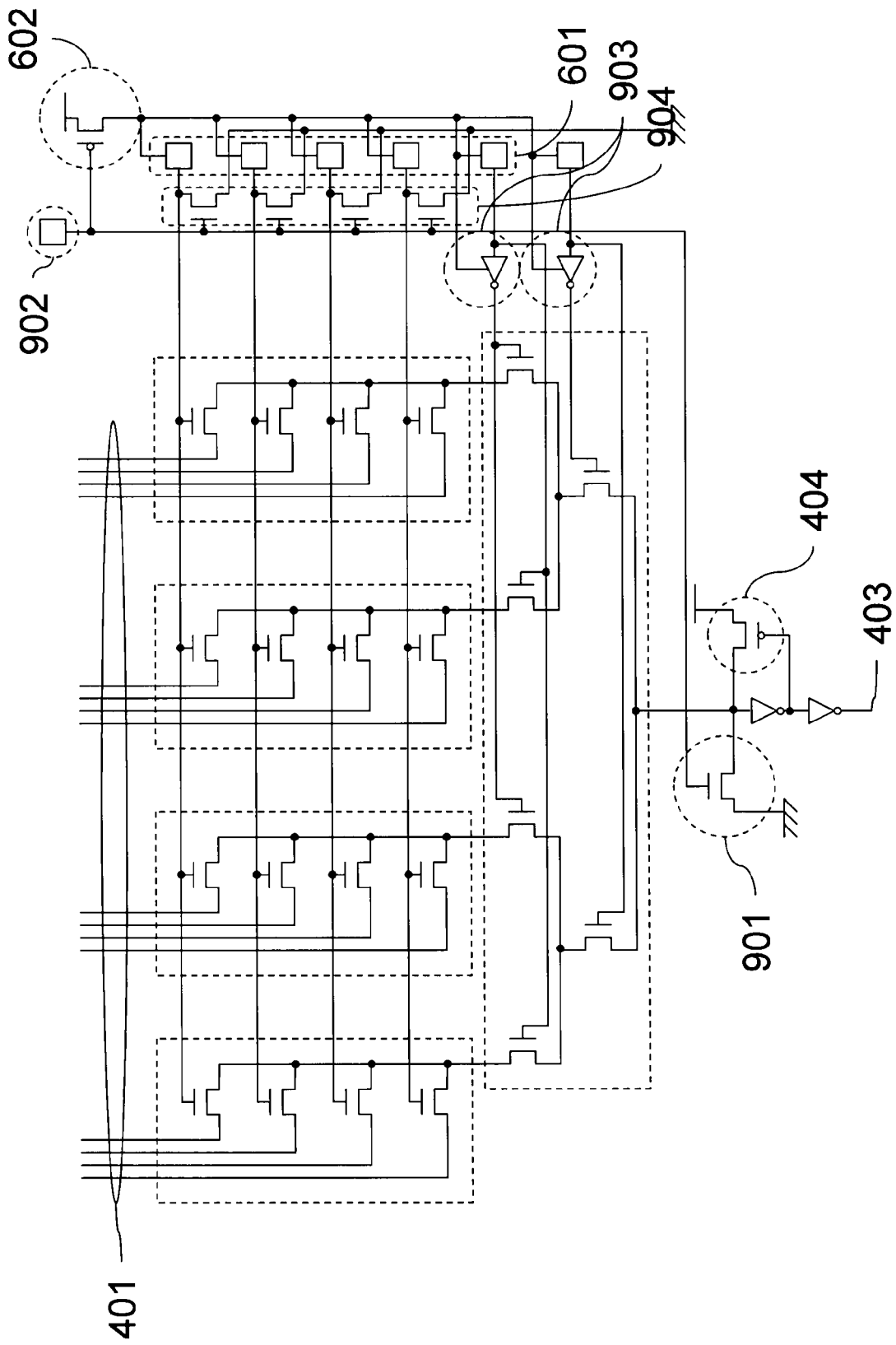
FIG. 18 shows hybrid type multiplexer with 16 inputs with a function to shut down power source of SRAM cell.

FIG. 17 and FIG. 18 show embodiments of applying the present invention to FIG. 7.

In FIG. 17, the SRAM shown in FIG. 10 is used in the multiplexer shown in FIG. 7, and the PMOS transistor inserted in the power supply line of the SRAM is controlled by the SRAM 902. The output of the SRAM cells 601 during nonuse is compulsorily grounded by the SRAM 902 and the pull down NMOSs 904. Since the SRAM cell for controlling the pull down NMOS 901 to pull down the output during nonuse can be identical with the SRAM 902 for controlling the PMOS 602 for shutting down the power source line, there is no increase of the SRAM cell due to this addition. The transistors required are 7 in total including 6 NMOSs for pulling down and 1 PMOS for shutting down the power source.

Since the multiplexer shown in FIG. 7 is composed of 88 transistors including SRAMs, this change can be realized by increasing number of transistors by less than or equal to 10%. Furthermore, number of SRAM cells operating during nonuse is 1, so that the leakage current of the SRAM can be decreased to about ⅐ as compared to FIG. 7.

FIG. 18 shows another embodiment of the present invention, where the power sources of the inverters for generating the inverted signals of the 2 SRAM cells for controlling the encode type multiplexer with 4 input as shown in FIG. 17 are also shut down at the same time by the SRAM 902 and the PMOS 602, and the pull down NMOSs 904 of the SRAM outputs are partially removed from FIG. 17. Although the gate input of the encode type multiplexer becomes a floating state during nonuse, which causes no problem because the decode type multiplexer is all in high impedance state. As compared to FIG. 17, 2 NMOSs can be omitted.

Figure 19:
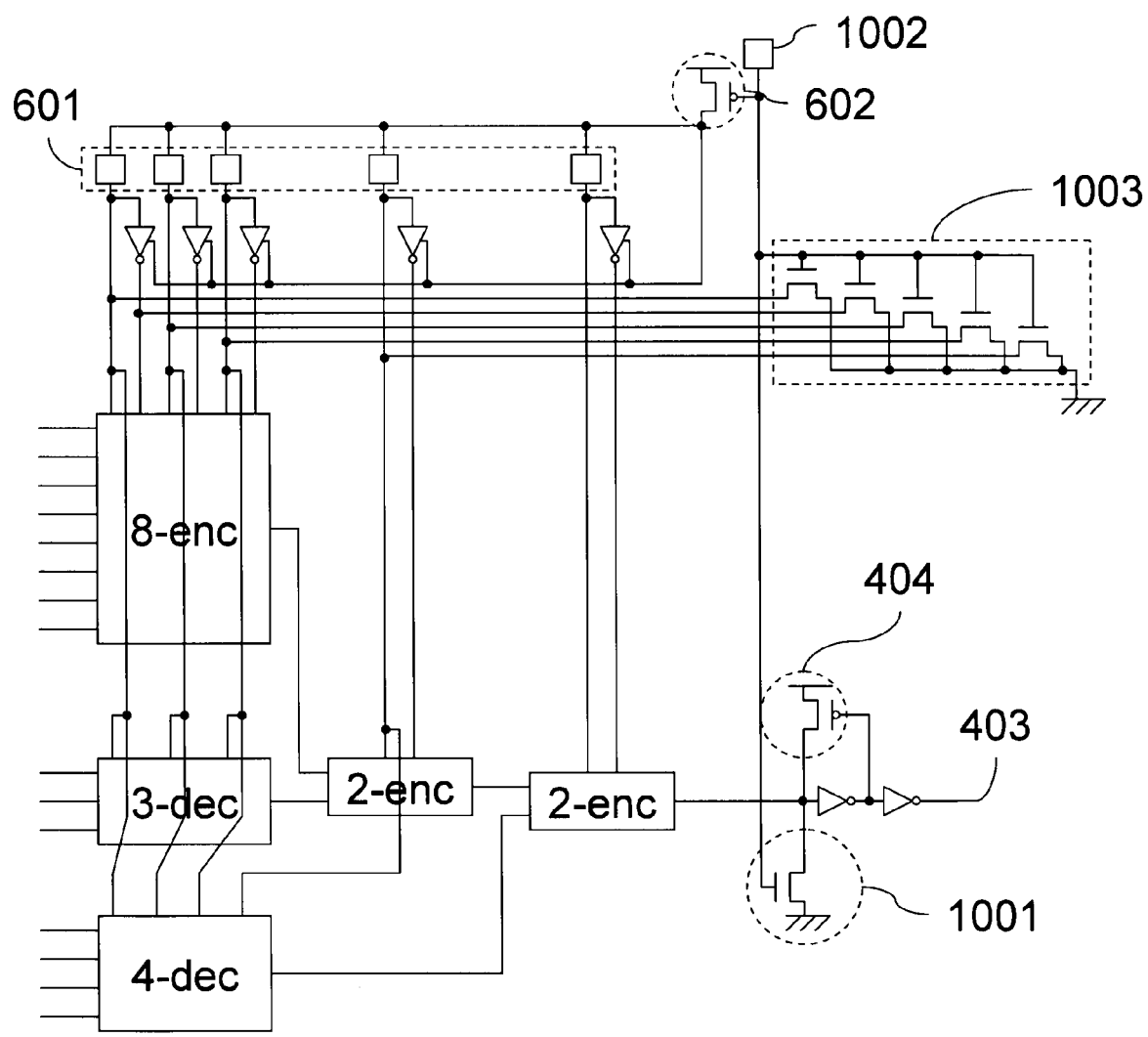
FIG. 19 shows an example of the present invention applied to a multiplexer shown in FIG. 8.

FIG. 19 shows an embodiment of applying the present invention to the multiplexer shown in FIG. 8. A PMOS 602 for shutting down the power source of the SRAM and an SRAM 1002 for controlling the PMOS are added to the multiplexer shown in FIG. 8. In this example, the power source of the inverter for generating an inverted signal of the SRAM is shared with the SRAM, and is capable of being shut down by the PMOS 602. Furthermore, in order to bring the input of the multiplexer in a high impedance state, the output of the SRAM for controlling the pass gate 601 in the nearest neighbor of the input side is enabled to be pulled down compulsorily by pull down NMOSs 1003 depending on the value of the SRAM 1002. More specifically, the output of the 4 SRAMs on the left hand and the inverted signal of the leftmost SRAM can be pulled down compulsorily. The reason why the inverted signal of the leftmost SRAM cell can be pulled down is that this signal is applied to the pass gate in the nearest neighborhood of the input of the 8-enc. This circuitry increases 6 transistors (by about 7%) as compared to the original circuitry shown in FIG. 8. Furthermore, the leakage current of the SRAM reduces to about ⅙ as compared to FIG. 8.

Embodiments of the present invention are not limited to the examples described above. For example, although the SRAM for shutting down the power source is used to control the pull down NMOS of the output buffer of the multiplexer in the embodiments shown in FIG. 13 to 19, a signal from the SRAM for shutting down the power source can be used to control transistors for shutting down the power source of buffers shown in Patent Document 1, and to select an inverse substrate bias in the case of having a structure capable of selecting a substrate bias.

Inverters are used to generate an inverted signal of the memory In FIGS. 5, 7 and 8, however, the inverters may simply be removed from FIGS. 13 to 19 when the inverted signal is extracted from the SRAM. Furthermore, all the multiplexer described above are composed of NMOS pass gates, however, PMOS pass gates or transfer gates being a combination of NMOS and PMOS may be used. Embodiments in which the power supply line side is shut down have been shown by using FIG. 10, however, the ground line side may be shut down when other memory cell structures are used.

According to the present invention, in reconfigurable integrated circuit apparatus such as FPGAs where circuit functions are controlled by SRAMs, leakage current of circuit resources not in use can be reduced by shutting down supply sources of SRAMs of interconnection switches. Since most of SRAMs of FPGAs are used to control interconnection switches, it is most effective to shut down power sources of interconnection switches. In the embodiment shown in FIG. 18 in which the present invention is applied to a typical multiplexer with 16 inputs (shown in FIG. 7) in an FPGA, the current of the SRAM can significantly be reduced to about ⅐ with a small increase in number of transistors by about 6%. Furthermore, if the control granularity is increased, flexibility is sacrificed, however, the area overhead and leakage current can be further reduced.

The present invention is applicable to a system LSI having a reconfigurable integrated circuit such as an FPGA as a core, and to its main application fields such as mobile terminals, digital home electronics, communication apparatus, servers, storages, and super computers.

What is claimed is:

1. A reconfigurable integrated circuit including transistors, comprising:
   a first switch with an input terminal, an output terminal, and a control terminal;
   a first memory with a memory cell connected to the control terminal of the first switch;
   a second switch to disconnect a power supply line or a ground line from the first memory; and
   a second memory to control the second switch,
   wherein a value to open the second switch is written into the second memory when the first switch is not operated to disconnect the power supply line or the ground line from the first memory.

2. The reconfigurable integrated circuit according to claim 1, wherein the control terminal of the first switch is connected to the first memory through a CMOS logic gate, and the CMOS logic gate shares a common power supply line or a ground line with the first memory.

3. The reconfigurable integrated circuit according to claim 1 or 2, further comprising:
   a third switch to connect the control terminal of the first switch to the ground line or the power supply line.

4. The reconfigurable integrated circuit according to claim 3, wherein the third switch is controlled by the second memory.

5. The reconfigurable integrated circuit according to claim 3, wherein the third switch connects only the control terminal of a group of transistors nearest to the input terminal of the first switch to the ground line or the power supply line.

6. The reconfigurable integrated circuit according to claim 1, wherein the output terminal of the first switch is connected to a switch which is controlled by the second memory and connected to the ground line or the power supply line.

7. The reconfigurable integrated circuit according to claim 1, wherein the input terminal and the output terminal of the first switch is connected to a CMOS logic gate to disconnect the power supply line or the ground line by using a switch which is controlled by the second memory.

8. The reconfigurable integrated circuit according to claim 1, wherein at least two inputs and one output of the first switch are connected by an encode type multiplexer.

9. The reconfigurable integrated circuit according to claim 1, wherein at least two inputs and one output of the first switch are connected by a decode type multiplexer.

10. The reconfigurable integrated circuit according to claim 1, wherein at least one of the first memory and the second memory is an SRAM.

11. The reconfigurable integrated circuit according to claim 1, wherein the second switch comprises a PMOS to disconnect the power supply line.

12. The reconfigurable integrated circuit according to claim 1, wherein the second switch comprises an NMOS to disconnect the ground line.

13. The reconfigurable integrated circuit according to claim 1, wherein the output terminal of the first switch includes a buffer and a switch, which is controlled by the second memory, to pull down the input terminal thereof.

14. The reconfigurable integrated circuit according to claim 1, wherein the output terminal of the first switch includes a buffer and a further switch, which is controlled by the second memory, to disconnect the power supply line or the ground line thereof.

15. The reconfigurable integrated circuit according to claim 14, wherein the further switch is identical with the second switch.

16. The reconfigurable integrated circuit according to claim 1, wherein the output terminal of the first switch includes a buffer and a bias control circuit to control or select a substrate bias thereof, and the bias control circuit is controlled by the second memory.

* * * * *